(12) United States Patent
Laney et al.

(10) Patent No.: US 6,808,780 B2
(45) Date of Patent: Oct. 26, 2004

(54) LOW BIREFRINGENCE FILM

(75) Inventors: Thomas M. Laney, Spencerport, NY (US); William J. Gamble, Rochester, NY (US); John E. Benson, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 102 days.

(21) Appl. No.: 10/328,343

(22) Filed: Dec. 23, 2002

(65) Prior Publication Data

US 2004/0121174 A1 Jun. 24, 2004

(51) Int. Cl.⁷ ................................................. B32B 3/02
(52) U.S. Cl. ...................... 428/64.1; 428/64.4; 264/167
(58) Field of Search ............................... 428/64.1, 64.4, 428/412, 522; 264/167, 171.1, 173.12, 173.16

(56) References Cited

U.S. PATENT DOCUMENTS

| | | | |
|---|---|---|---|
| 3,476,627 A | | 11/1969 | Squires |
| 3,557,265 A | | 1/1971 | Chisholm et al. |
| 4,235,365 A | * | 11/1980 | Yoshii et al. ............... 383/108 |
| 4,336,012 A | | 6/1982 | Koch et al. |
| 4,410,587 A | | 10/1983 | Fair et al. |
| 4,617,207 A | | 10/1986 | Ueki et al. |
| 5,075,060 A | * | 12/1991 | Imataki ...................... 264/167 |
| 6,638,637 B2 | * | 10/2003 | Hager et al. ................ 428/516 |
| 2002/0114922 A1 | * | 8/2002 | Bourne et al. .............. 428/141 |

* cited by examiner

Primary Examiner—Elizabeth Mulvaney
(74) Attorney, Agent, or Firm—Arthur E. Kluegel

(57) ABSTRACT

Disclosed is a coextruded film comprising a transparent polymeric inner core layer of thickness less than 250 $\mu$m and two peelable outer polymeric layers wherein the inner layer constitutes a low enough proportion, less than 40%, of the total film thickness and exhibits a low enough melt flow index value to achieve a birefringence of not more than $1 \times 10^{-4}$ nm/nm.

36 Claims, No Drawings

LOW BIREFRINGENCE FILM

FIELD OF THE INVENTION

This invention relates to a film having improved low birefringence, to a multilayer film comprising a layer of such film, and to methods and optical devices for making and using such films.

BACKGROUND OF THE INVENTION

Use of optical storage devices has become common since the advent of the compact disc (CD) widely used for the storage of music, video and other information. Optical storage devices of this type require transparent substrates with excellent optical properties. A substrate is encoded with information often by molding in a series of pits or depressions. Suitably coated this substrate can be read by a laser to give a series of signals recovering the information stored on the disc. With storage devices of this type, there is a growing need to store more and more information in a smaller space.

Thermoplastic polymers such as Bisphenol A Polycarbonate (BPA-PC) have been widely used for optical storage media applications, however, thermo plastics such as BPA-PC have some limitations. It is rather difficult to process thermoplastics in an extrusion film process and meet the optical requirements for optical storage media. In these applications thermoplastic polymers such as BPA-PC and optical data storage devices made from them are limited by their birefringence. Birefringence, resulting from the inherent properties of the resin and also from how it was processed (influenced by its rheological properties) can interfere with the recovery of information stored on the device (i.e. disc).

In the further development of optical discs, particularly read-write discs and discs which are capable of storing larger amounts of data, various physical factors become increasingly important. Again, one such factor, which is closely related to the storage capacity of the disc, is birefringence, i.e., the difference between indices of refraction for light polarized in perpendicular directions. Birefringence leads to phase retardation between different polarization components of the laser beam (i.e., a polarization-dependent effect), thereby reducing readability of the disc. Therefore thermoplastic films having low birefringence, typically not more than $1 \times 10^{-4}$ nm/nm, are desirable components for optical discs.

Other applications for films with low birefringence, typically not more than $1 \times 10^{-4}$ nm/nm, are polarizers for liquid crystal displays.

Birefringence has several sources including the physical processing of the raw material from which films are fabricated, the degree of molecular orientation therein, and thermal stresses in a fabricated film. The observed birefringence of a film is therefore determined by the molecular structure, which determines the intrinsic birefringence, and the processing conditions, which can create thermal stresses and orientation of the polymer chains. Specifically, the observed birefringence is typically a function of the intrinsic birefringence plus the birefringence introduced upon fabricating articles such as film substrates.

Shear stress introduced at the wall of extrusion dies used to form thermoplastic films such as BPA-PC result in highly oriented molecular structure of the film in the proximity of the outer surfaces of such films. This oriented molecular structure results in much higher birefringence of the film near the surfaces and thus high total birefringence of the bulk film.

It has been common practice to prepare low birefringence films using solvent-borne film coating materials in which stresses are relieved through the slow evaporation of the solvents. However, such processes are undesirable from the emissions standpoint and from the standpoint of the presence of entrained solvents in the polymeric film. Solvent cast, e.g. polycarbonate, sheet can be made with relatively low birefringence, but processing speeds are very slow (and expensive). The samples retain excessive levels of residual casting solvent. Standard molecular weight polycarbonate can also crystallize from solution instead of casting a clear (mostly amorphous) sheet.

It has been disclosed in U.S. Pat. No. 4,617,207 that by co-extruding a thermoplastic resin sheet in the core of two non-adhesive peelable resins that the shear stress introduced at the wall of extrusion dies used to form the thermoplastic film is reduced resulting in films with low double refractive index or birefringence. However, thermoplastic films of desirable materials for optical read and write storage medias, such as polycarbonate, polyester, polystyrene, and poly (methylmethacrylate) were not demonstrated at the desirable thicknesses (less than 250 μm) for such applications in U.S. Pat. No. 4,617,207. It has been shown that only under special conditions can such films of the desired thickness and birefringence be produced. Such films also have utility as polarizers for liquid crystal displays where again, films of less than 250 μm are desirable.

Therefore, there is a need to be able to prepare extruded thermoplastic transparent melt processable films of thickness less than 250 μm that exhibit a birefringence of less than $1 \times 10^{-4}$ nm/nm.

SUMMARY OF THE INVENTION

The invention provides a coextruded film comprising a transparent polymeric inner core layer of thickness less than 250 μm and two peelable outer polymeric layers wherein the inner layer constitutes a low enough proportion, less than 40%, of the total film thickness and exhibits a low enough melt flow index value to achieve a birefringence of not more than $1 \times 10^{-4}$ nm/nm. The invention also provides such a film bearing one peelable layer, the extruded inner layer film, and a process and optical devices for making and using such films.

The invention provides low birefringence films that have a birefringence of not more than $1 \times 10^{-4}$ nm/nm, have no residual solvent, and are less than 250 μm thick.

DETAILED DESCRIPTION OF THE INVENTION

The thermoplastic resin sheet according to this invention is required to be transparent, have a thickness of less than 250 μm, be free of any residual solvents, have a birefringence of not more than $1 \times 10^{-4}$ nm/nm, and have a low manufacturing cost.

Thermoplastic resins usable in the above-described sheet are polycarbonate resins, acrylate resins, polystyrene resins, and polyester resins.

Although the thermoplastic resins listed above by way of example may be shaped into film structures by the extrusion technique, calendering technique or solution casting technique, it is preferable to extrude a first thermoplastic resin and a second thermoplastic resin nonadhesive to the first thermoplastic resin into at least three layers so that the first thermoplastic resin forms a core layer and the second thermoplastic resin forms outer layers laminated on both surfaces of the core layer, and then to peel off the outer layers. It is preferable to choose resins which are adapted to form the core layer from the above-mentioned specific thermoplastic resins.

The sheets according to this invention can advantageously be used, owing to their characteristic feature of low birefringence, as substrates for optical storage medias, liquid crystal displays, and in other fields.

According to the present invention, a thermoplastic film is produced by co-extruding a first thermoplastic resin and a second thermoplastic resin into a sheet-like structure so that the resulting layer of the first thermoplastic resin is covered on both surfaces thereof with outer layers of the second thermoplastic resin, and then by peeling off the outer layers of the second thermoplastic resin to obtain a sheet of the first thermoplastic resin.

The first thermoplastic resin can comprise a carbonate, ester, styrene, or acrylate repeating unit. Among these exemplary resins, polycarbonate resins and polyester resins are preferred. It is important that the Melt flow Index (as described by ASTM D1238 using the conditions of 300° C. and a 1.2 kg weight) of the first thermoplastic resin of choice should be of low enough value to result in a film with a birefringence of no more than $1 \times 10^{-4}$ nm/nm. If the first thermoplastic resin comprises polycarbonate the Melt Flow Index (MFI) should be no greater than 2.5. If the first thermoplastic resin comprises polyester, such as polyethylene terephthalate, the Melt Flow Index is desirably no greater than 22.0. Higher Melt Flow Index materials have lower viscosity when processed resulting in birefringence of the core layer greater than $1 \times 10^{-4}$ nm/nm.

The second thermoplastic resin useful in the practice of this invention is immiscible with (does not mix or blend with) the first thermoplastic resin. This results in the second thermoplastic resin being non-adhesive to the first thermoplastic resin, and its type can be chosen in view of the type of its matching first thermoplastic resin.

The first thermoplastic resin and the second thermoplastic resin, which can be used in the present invention, may be of any combination so long as layers of the second thermoplastic resin can be readily peelable from a layer of the first thermoplastic resin after their co-extrusion into multiple adjacent layers. When a polycarbonate resin is chosen by way of example as the first thermoplastic resin, it is possible to choose as the matching second thermoplastic resin olefins such as low-density polyethylene, high-density polyethylene, and polypropylene. The combination of a polycarbonate with polypropylene is especially advantageous because they result in a substantially defect free surface of the core polycarbonate layer after being peeled apart.

The term "immiscible" or "non-adhesive" as used herein defines not only combinations in which neither resin layer adheres to the other but also combinations in which both resin layers are readily peelable.

In the present invention, the first thermoplastic resin and the second thermoplastic resin are co-extruded in such a way that the second thermoplastic resin covers both surfaces of the resulting layer of the first thermoplastic resin. The co-extrusion may be carried out by using the feed block method in which both resins are laminated by a feed block immediately before their entry to a T die and then fed to the T die (see, for example, U.S. Pat. Nos. 3,557,265, 3,476,627 and 4,336,012) or the multi-manifold method in which both resins are laminated in a T die see, for example, Kenkichi Murakami, "Plastics Age" 21(9), 74(1975)!.

Pertaining to the laminated layer structure of the first and second thermoplastic resins to be obtained upon co-extrusion, it is generally advantageous to use the same resin as the second thermoplastic resin which makes up both outer layers, in other words, to take a structure of three layers made up of two types of resins, i.e., a 2/1/2-type structure because the above structure does not require handling a variety of resins. It is of course possible to use different of resins as the second thermoplastic resin making up both outer layers so that the resulting laminate takes a structure of three layers made up of three different resins.

It may also be feasible to laminate additional layers made of another resin over the outer layers made of the second thermoplastic resin, for example, into a structure such as 3/2/1/2/3. Alternatively, the co-extruded laminate may take another structure such as 2/1/2/1/2. Further, it may also take a further structure of 2/1/3/1/2 so as to obtain a final sheet having the 1/3/1 structure. In addition it may also take a further structure 2/1/1'/2' wherein the resin 2' is nonadhesive to the resin 1' so as to take a final sheet having 1/1' structure.

The proportion of the thickness of the first thermoplastic resin in the total thickness of each co-extruded sheet-like laminate is preferably 40% or smaller. If the proportion should exceed 40%, the resulting sheet of the first thermoplastic resin has a larger birefringence. Therefore, use of such a high proportion is not desired. Preferably the proportion should not exceed 25%.

The peeling-off of the outer sheets made of the second thermoplastic resin from the sheet-like laminate can be effected with ease because the first and second thermoplastic resins are immiscible and nonadhesive to each other. It is desirable to peel off the outer sheets immediately before winding the core layer into roll form in order to keep the core layer free from deposition of dust or scratches. However, it is possible to further improve the core film surface quality by subsequently heating and calendaring the core film after peeling away the outer layers.

As previously mentioned desirable thicknesses of the core layer or layers is less than 250 $\mu$m and generally should be no less than 25 $\mu$m. In a preferred embodiment the thickness would be a range between 75 and 125 $\mu$m. The thickness of each of the outer peelable layers in this preferred embodiment is desirably at least 50% thicker than the core layer to help optimize low birefringence of the core layer.

The thermoplastic resin useful in the practice of the process of this invention in the outer peelable layers may also contain a variety of addenda such as processing aids, release agents, lubricants, slip agents, antiblocks, and plasticizers without causing problems. Such addenda are well known in the art as is referenced in "Plastics Additives Handbook", $4^{th}$ Edition edited by R. Gächter and H. Müller.

It is desirable to wind the first thermoplastic resin of the core layer into a wound roll form after peeling the outer layers away. It is sometimes desirable to interleave a masking film into the roll to protect the core layer and to prevent it from sticking to itself. As a means to reduce processing steps and the cost of the rolled film one of the two outer layers could be kept adjacent to the core layer and wound into the roll along with the core layer serving as a masking film.

The core layer films of this invention can be used as a component of an optical device due to the low birefringence of the films. Typical devices that such components can be used in are optical read memory devices and liquid crystal imaging devices. Typical uses would be as the cover sheet for digital video discs and as the polarizer films for liquid crystal displays.

EXAMPLES

The following examples were produced to illustrate the invention.

Example 1 (Comparative)

Polycarbonate ("PC", Lexan 151® from GE Plastics, MFI=2.5) was dried in a desiccant dryer at 120° C. for 8 hours. A 3-layer multi-manifold coextrusion die, 18 cm. (7") wide, was connected to three different extruders. One extruder fed each manifold of the die. A cast sheet was extruded using a 2.5 cm. (1") extruder to extrude the dried PC through one of the outside layers of the die, a 3.2 cm. (1¼") extruder to extrude the dried PC through the manifold on the other side of the die, and a 1.9 cm (¾") extruder to feed the dried PC through the center manifold of the die. Each melt stream as well as the die were maintained at 300° C. As the extruded sheet emerged from the die, it was cast onto a quenching roll set at 55° C. The final dimensions of the continuous cast sheet were 18 cm wide and 50 µm thick.

After stripping from the quenching roll samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $2.8 \times 10^{-4}$ nm/nm.

Example 2 (Comparative)

Polycarbonate ("PC", Lexan 121® from GE Plastics, MFI=17.5) was dried in a desiccant dryer at 120° C. for 8 hours. A 3-layer multi-manifold co-extrusion die, 18 cm. (7") wide, was connected to three different extruders. One extruder fed each manifold of the die. A cast sheet was extruded using a 2.5 cm. (1") extruder to extrude Polypropylene ("PP", Huntsman P4G2Z-073AX) through one of the outside layers of the die, a 3.2 cm. (1¼") extruder to extrude the same PP through the manifold on the other side of the die, and a 1.9 cm (¾") extruder to feed the dried PC through the center manifold of the die. Each melt stream as well as the die were maintained at 300° C. As the extruded sheet emerged from the die, it was cast onto a quenching roll set at 55° C. The final dimensions of the continuous cast sheet were 18 cm wide and 370 µm thick. The two PP outer layers were each 13 µm thick while the center PC core layer was 100 µm thick.

After stripping from the quenching roll the two outside PP layers were split away from the core PC layer. Samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $2.5 \times 10^{-4}$ nm/nm.

Example 3 (Comparative)

Polycarbonate ("PC", Lexan 141® from GE Plastics, MFI=10.5) was dried in a desiccant dryer at 120° C. for 8 hours. A 3-layer multi-manifold coextrusion die, 18 cm. (7") wide, was connected to three different extruders. One extruder fed each manifold of the die. A cast sheet was extruded using a 2.5 cm. (1") extruder to extrude Polypropylene ("PP", Huntsman P4G2Z-073AX) through one of the outside layers of the die, a 3.2 cm. (1¼") extruder to extrude the same PP through the manifold on the other side of the die, and a 1.9 cm (¾") extruder to feed the dried PC through the center manifold of the die. Each melt stream as well as the die were maintained at 300° C. As the extruded sheet emerged from the die, it was cast onto a quenching roll set at 55° C. The final dimensions of the continuous cast sheet were 18 cm wide and 370 µm thick. The two PP outer layers were each 135 µm thick while the center PC core layer was 100 µm thick.

After stripping from the quenching roll the two outside PP layers were split away from the core PC layer. Samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $1.8 \times 10^{-4}$ nm/nm.

Example 4 (Comparative)

Polycarbonate ("PC", Lexan 151® from GE Plastics, MFI=2.5) was dried in a desiccant dryer at 120° C. for 8 hours. A 3-layer multi-manifold co-extrusion die, 18 cm. (7") wide, was connected to three different extruders. One extruder fed each manifold of the die. A cast sheet was extruded using a 1" extruder to extrude Polypropylene ("PP", Huntsman P4G2Z-073AX) through one of the outside layers of the die, a 3.2 cm. (1¼") extruder to extrude the same PP through the manifold on the other side of the die, and a 1.9 cm (¾") extruder to feed the dried PC through the center manifold of the die. Each melt stream as well as the die were maintained at 300° C. As the extruded sheet emerged from the die, it was cast onto a quenching roll set at 55° C. The final dimensions of the continuous cast sheet were 18 cm wide and 370 µm thick. The two PP outer layers were each 135 µm thick while the center PC core layer was 100 µm thick.

After stripping from the quenching roll the two outside PP layers were split away from the core PC layer. Samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $1.5 \times 10^{-4}$ nm/nm.

Example 5 (Comparative)

Polycarbonate ("PC", Lexan 151® from GE Plastics, MFI=2.5) was dried in a desiccant dryer at 120° C. for 8 hours. A 3-layer multi-manifold co-extrusion die, 18 cm. (7") wide, was connected to three different extruders. One extruder fed each manifold of the die. A cast sheet was extruded using a 2.5 cm. (1") extruder to extrude Polypropylene ("PP", Huntsman P4G2Z-073AX) through one of the outside layers of the die, a 3.2 cm. (1¼") extruder to extrude the same PP through the manifold on the other side of the die, and a 1.9 cm (¾") extruder to feed the dried PC through the center manifold of the die. Each melt stream as well as the die was maintained at 300° C. As the extruded sheet emerged from the die, it was cast onto a quenching roll set at 55° C. The final dimensions of the continuous cast sheet were 18 cm wide and 250 µm thick. The two PP outer layers were each 75 µm thick while the center PC core layer was 100 µm thick.

After stripping from the quenching roll the two outside PP layers were split away from the core PC layer. Samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $3.9 \times 10^{-4}$ nm/nm.

Example 6 (Invention)

Polycarbonate ("PC", Lexan 151® from GE Plastics, MFI=2.5) was dried in a desiccant dryer at 120° C. for 8 hours. A 3-layer multi-manifold co-extrusion die, 18 cm. (7") wide, was connected to three different extruders. One extruder fed each manifold of the die. A cast sheet was extruded using a 2.5 cm. (1") extruder to extrude Polypropylene ("PP", Huntsman P4G2Z-073AX) through one of the outside layers of the die, a 3.2 cm. (1¼") extruder to extrude the same PP through the manifold on the other side of the die, and a 1.9 cm (¾") extruder to feed the dried PC through the center manifold of the die. Each melt stream as well as the die was maintained at 300° C. As the extruded sheet emerged from the die, it was cast onto a quenching roll set at 55° C. The final dimensions of the continuous cast sheet were 18 cm wide and 450 μm thick. The two PP outer layers were each 175 μm thick while the center PC core layer was 100 μm thick.

After stripping from the quenching roll the two outside PP layers were split away from the core PC layer. Samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $0.5 \times 10^{-4}$ nm/nm.

Example 7 (Invention)

Polycarbonate ("PC", Lexan 151® from GE Plastics, MFI=2.5) was dried in a desiccant dryer at 120° C. for 8 hours. A 3-layer multi-manifold co-extrusion die, 18 cm. (7") wide, was connected to three different extruders. One extruder fed each manifold of the die. A cast sheet was extruded using a 2.5 cm. (1") extruder to extrude Polypropylene ("PP", Huntsman P4G2Z-073AX) through one of the outside layers of the die, a 3.2 cm. (1¼") extruder to extrude the same PP through the manifold on the other side of the die, and a ¾" extruder to feed the dried PC through the center manifold of the die. Each melt stream as well as the die was maintained at 300° C. As the extruded sheet emerged from the die, it was cast onto a quenching roll set at 55° C. The final dimensions of the continuous cast sheet were 18 cm wide and 210 μm thick. The two PP outer layers were each 80 μm thick while the center PC core layer was 50 μm thick.

After stripping from the quenching roll the two outside PP layers were split away from the core PC layer. Samples of the PC were taken and thickness and X,Y retardation was measured at 400 nm wavelength using a spectroscopic ellipsometer (J. A. Woollam model M-2000V). X,Y Birefringence was then calculated (retardation divided by sample thickness) to be $1 \times 10^{-4}$ nm/nm.

Example 8 (Invention)

Polyethylene Terephthalate (PET)(#7352 from Eastman Chemicals, MFI=21.5) was dried in a desiccant dryer at 150° C. for 8 hours. A 3-layer multi-manifold co-extrusion die, 18 cm. (7") wide, was connected to three different extruders. One extruder fed each manifold of the die. A cast sheet was extruded using a 2.5 cm. (1") extruder to extrude Polypropylene ("PP", Huntsman P4G2Z-073AX) through one of the outside layers of the die, a 3.2 cm. (1¼") extruder to extrude the same PP through the manifold on the other side of the die, and a ¾" extruder to feed the dried PET through the center manifold of the die. Each melt stream as well as the die was maintained at 275° C. As the extruded sheet emerged from the die, it was cast onto a quenching roll set at 55° C. The final dimensions of the continuous cast sheet were 18 cm wide and 250 μm thick. The two PP outer layers were each 100 μm thick while the center PC core layer was 50 μm thick.

After stripping from the quenching roll the two outside PP layers were split away from the core PET layer. Samples of the PET were taken and thickness and X,Y retardation was measured at 400 nm wavelength using a spectroscopic ellipsometer (J. A. Woollam model M-2000V). X,Y Birefringence was then calculated (retardation divided by sample thickness) to be $0.7 \times 10^{-4}$ nm/nm.

Table 1 summarizes each example along with the calculated X,Y birefringence.

TABLE 1

| SAMPLE | MATERIALS/ STRUCTURE | CORE THICK. (μm) | SKIN THICK. (μm) | CORE RATIO (%) | CORE MFI* | BIREFRINGENCE (× $10^{-4}$ nm/nm) |
|---|---|---|---|---|---|---|
| Example 1 (Comparative) | PC | 50 | NA | NA | 2.5 | 2.8 |
| Example 2 (Comparative) | PP/PC/PP | 100 | 135 | 27 | 17.5 | 2.5 |
| Example 3 (Comparative) | PP/PC/PP | 100 | 135 | 27 | 10.5 | 1.8 |
| Example 4 (Comparative) | PP/PC/PP | 100 | 135 | 27 | 2.5 | 1.5 |
| Example 5 (Comparative) | PP/PC/PP | 100 | 75 | 40 | 2.5 | 3.9 |
| Example 6 (Invention) | PP/PC/PP | 100 | 175 | 22 | 2.5 | 0.5 |
| Example 7 (Invention) | PP/PC/PP | 50 | 80 | 24 | 2.5 | 1 |
| Example 8 (Invention) | PP/PET/PP | 50 | 100 | 20 | 21.5 | 0.7 |

It can be seen in Table 1 that when an all PC film was extruded without any peelable layers (Example 1) the birefringence level was well above the desired level. For PC core films with peelable layers (PP in these examples), only when the MFI is 2.5 and the core layer thickness ratio is sufficiently low are the desirable birefringence levels (not more than $1 \times 10^{-4}$ nm/nm) attained. The PET core sample of Example 8 attains the desired level of birefringence as the core layer ratio is less than 40% and the MFI is sufficiently low for PET to attain such a value. It would be expected that for PETs with a higher MFI the birefringence level would increase to undesirable levels.

The entire contents of the patents and other publications referred to in this specification are incorporated herein by reference.

What is claimed is:

1. A coextruded film comprising a transparent polymeric inner core layer of thickness less than 250 μm and two peelable outer polymeric layers wherein the inner layer constitutes a low enough proportion, less than 40%, of the total film thickness and exhibits a low enough melt flow index value to achieve a birefringence of not more than $1 \times 10^{-4}$ nm/nm.

2. A co-extruded film of claim 1 wherein the inner layer constitutes less than 25% of the total film thickness.

3. A co-extruded film of claim 1 predominantly comprising polycarbonate wherein the inner layer constitutes less than 25% of the total film thickness and exhibits a melt flow index value of not more 2.5.

4. A co-extruded film of claim 1 predominantly comprising polyester wherein the inner layer constitutes less than 25% of the total film thickness and the core layer exhibits a melt flow index value of not more 22.0.

5. The co-extruded film of claim 1 wherein the transparent polymeric inner layer comprises a carbonate, ester, styrene, or acrylate repeating unit.

6. The co-extruded film of claim 1 wherein the transparent polymeric inner layer comprises a carbonate repeating unit.

7. The co-extruded film of claim 1 wherein the transparent polymeric inner layer comprises an ester repeating unit.

8. The co-extruded film of claim 1 wherein the transparent polymeric inner layer comprises a styrene repeating unit.

9. The co-extruded film of claim 1 wherein the transparent polymeric inner layer comprises an acrylate repeating unit.

10. The co-extruded film of claim 1 wherein the two peelable outer polymeric layers comprise a polymer that is immiscible with the inner layer.

11. The co-extruded film of claim 1 wherein the two peelable outer polymeric layers comprise an olefin derivative repeating unit.

12. The co-extruded film of claim 1 wherein the two peelable outer polymeric layers comprise a propylene derivative repeating unit.

13. The co-extruded film of claim 1 wherein the transparent polymeric inner layer is between 25 and 250 μm in thickness.

14. The co-extruded film of claim 1 wherein the transparent polymeric inner layer is between 75 and 125 μm in thickness.

15. The co-extruded film of claim 1 wherein the two peelable outer polymeric layers are each at least 50% thicker than the core layer.

16. The co-extruded film of claim 1 wherein the two peelable outer polymeric layers contain a processing aid.

17. The co-extruded film of claim 1 wherein the two peelable outer polymeric layers contain a release agent, lubricant, or slip agent.

18. The co-extruded film of claim 1 wherein the two peelable outer polymeric layers contain a plasticizer.

19. The co-extruded film of claim 1 wherein the two peelable outer polymeric layers contain an antiblock agent.

20. The co-extruded film of claim 1 wherein the transparent polymeric inner layer contains a processing aid.

21. The co-extruded film of claim 1 wherein the transparent polymeric inner layer contains a release agent, lubricant, or slip agent.

22. The co-extruded film of claim 1 wherein the transparent polymeric inner layer contains an antiblock agent.

23. The co-extruded film of claim 1 wherein the two peelable outer polymeric layers comprise the same composition.

24. The co-extruded film of claim 1 wherein the two peelable outer polymeric layers comprise different compositions.

25. A process for forming a low birefringence layer comprising coextruding film comprising a transparent polymeric inner layer of thickness less than 250 μm and two peelable outer polymeric layers wherein the inner layer constitutes a low enough % of the total film thickness, less than 40%, and exhibits a low enough melt flow index value to achieve a birefringence of not more than $1 \times 10^{-4}$ nm/nm.

26. The process of claim 25 wherein a heating and calendaring step is performed on said inner layer subsequent to peeling away one or both of the two peelable outer polymeric layers.

27. A transparent layer material obtained by the separation of the two peelable outer polymeric layers of claim 25 from the inner layer.

28. The inner layer material of claim 27 in rolled form.

29. The inner layer material of claim 28 in rolled form with an interleaved masking film.

30. A coextruded film comprising a transparent polymeric layer of thickness less than 250 μm and one peelable outer polymeric layer wherein the transparent layer constitutes a low enough proportion, less than 60%, of the total film thickness and exhibits a low enough melt flow index value to achieve a birefringence of not more than $1 \times 10^{-4}$ nm/nm.

31. The film of claim 30 in rolled form.

32. A component of an optical device comprising the film of claim 27.

33. An optical device comprising the component of claim 27.

34. A liquid crystal imaging device comprising the film of claim 27.

35. An optical read memory device comprising the film of claim 27.

36. A digital video disc comprising the film of claim 27.

* * * * *